(12) United States Patent
Huang et al.

(10) Patent No.: US 9,243,557 B2
(45) Date of Patent: Jan. 26, 2016

(54) SHUNT PULSATION TRAP FOR POSITIVE DISPLACEMENT (PD) INTERNAL COMBUSTION ENGINES (ICE)

(76) Inventors: Paul Xiubao Huang, Fayetteville, GA (US); Sean William Yonkers, Peachtree City, GA (US)

( * ) Notice: Subject to any disclaimer, the term of this patent is extended or adjusted under 35 U.S.C. 154(b) by 356 days.

(21) Appl. No.: 13/621,202

(22) Filed: Sep. 15, 2012

(65) Prior Publication Data
US 2013/0247849 A1  Sep. 26, 2013

Related U.S. Application Data

(60) Provisional application No. 61/535,989, filed on Sep. 17, 2011.

(51) Int. Cl.
| | |
|---|---|
| *F04C 29/06* | (2006.01) |
| *F01N 1/00* | (2006.01) |
| *F01N 1/02* | (2006.01) |
| *F02B 77/00* | (2006.01) |
| *F01N 1/10* | (2006.01) |
| *F02B 27/04* | (2006.01) |
| *F01N 1/08* | (2006.01) |
| *F01N 1/16* | (2006.01) |

(52) U.S. Cl.
CPC . *F02B 77/00* (2013.01); *F01N 1/02* (2013.01); *F01N 1/089* (2013.01); *F01N 1/10* (2013.01); *F01N 1/161* (2013.01); *F01N 1/166* (2013.01); *F02B 27/04* (2013.01); *F01N 2490/08* (2013.01); *Y02T 10/146* (2013.01)

(58) Field of Classification Search
CPC ............ F01N 1/02; F01N 1/24; F02B 27/00; F02B 27/04; F04C 29/061; F04C 29/0035
USPC ............................................. 60/311, 324, 312
See application file for complete search history.

(56) References Cited

U.S. PATENT DOCUMENTS

| | | | |
|---|---|---|---|
| 2,489,887 A | 11/1949 | Houghton | |
| 4,215,977 A | 8/1980 | Weatherston | |
| 4,558,566 A * | 12/1985 | Shirakura | 60/314 |
| 4,984,974 A | 1/1991 | Naya et al. | |
| 5,051,077 A | 9/1991 | Yanagisawa et al. | |
| 5,217,817 A * | 6/1993 | Verspui et al. | 428/621 |

(Continued)

FOREIGN PATENT DOCUMENTS

| | | | |
|---|---|---|---|
| JP | 60252117 A * | 12/1985 | |
| JP | 01032085 | 2/1989 | |

(Continued)

*Primary Examiner* — Kenneth Bomberg
*Assistant Examiner* — Anthony Ayala Delgado
(74) *Attorney, Agent, or Firm* — Gardner Groff Greenwald & Villanueva, P.C.

(57) ABSTRACT

A shunt pulsation trap for a positive displacement (PD) internal combustion engine (ICE) reduces pulsation, as well as noise, vibration and harshness (NVH), and the overall size of the exhaust system, and also improves cycle (fuel) efficiency. A shunt pulsation trap for a PD-ICE is configured to trap and attenuate gas pulsations before discharge to engine outlet and includes a chamber (trap volume) adjacent to the PD-ICE cavity. The chamber houses at least one pulsation dampening device, at least one relief port (trap inlet) branching off from the PD-ICE cavity into the pulsation trap chamber and a feedback region (trap outlet) communicating with the PD-ICE outlet. The associated methods of reducing pulsations are included as another aspect of the invention.

19 Claims, 12 Drawing Sheets

(56) References Cited

U.S. PATENT DOCUMENTS

| | | | |
|---|---|---|---|
| 5,370,512 A | 12/1994 | Fujitani et al. | |
| 5,614,699 A * | 3/1997 | Yashiro et al. | 181/254 |
| 5,975,035 A * | 11/1999 | McWhorter | 123/79 R |
| 6,331,103 B1 | 12/2001 | Teraoka | |
| 6,874,486 B2 | 4/2005 | Prior et al. | |
| 8,172,039 B2 * | 5/2012 | Park et al. | 181/256 |
| 2002/0033302 A1 * | 3/2002 | Kaneko et al. | 181/232 |
| 2006/0243520 A1 | 11/2006 | Hertenstein et al. | |
| 2008/0168961 A1 | 7/2008 | Prior et al. | |
| 2010/0269797 A1 | 10/2010 | Prior | |
| 2011/0300014 A1 | 12/2011 | Huang et al. | |
| 2012/0020824 A1 | 1/2012 | Huang et al. | |
| 2012/0171069 A1 | 7/2012 | Huang et al. | |
| 2012/0237378 A1 | 9/2012 | Huang et al. | |

FOREIGN PATENT DOCUMENTS

| | | |
|---|---|---|
| JP | 03124986 | 5/1991 |
| JP | 07332273 | 12/1995 |

* cited by examiner

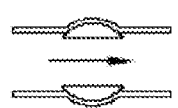 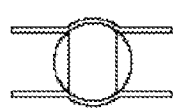  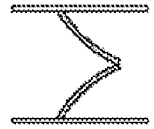
FIG. 9A
Rotary Valve
left: open
right: close
FIG. 9B
Reed Valve
left: open
right: close
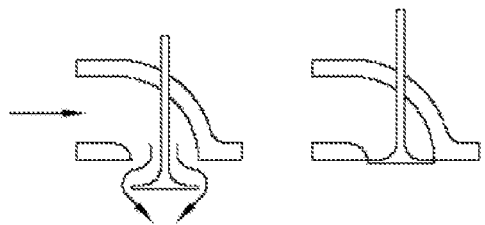 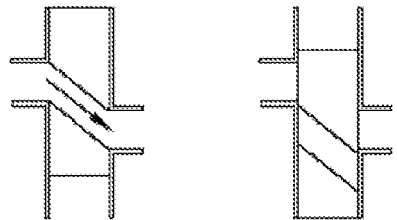
FIG. 9C
Poppet Valve
left: open
right: close
FIG. 9D
Sleeve Valve
left: open
right: close

SHUNT PULSATION TRAP FOR POSITIVE DISPLACEMENT (PD) INTERNAL COMBUSTION ENGINES (ICE)

CLAIM OF PRIORITY

This application claims priority to Provisional U.S. Patent Application entitled A SHUNT PULSATION TRAP FOR POSITIVE DISPLACEMENT (PD) INTERNAL COMBUSTION ENGINES (ICE), filed Sep. 17, 2011, having application No. 61/535,989, the disclosure of which is hereby incorporated by reference in its entirety.

BACKGROUND OF THE INVENTION

1. Field of the Invention

The present invention relates generally to the field of positive displacement (PD) type internal combustion engines (ICE), and more specifically relates to a shunt pulsation trap for improving its thermodynamic cycle efficiency and for reducing exhaust gas pulsation and induced noise, vibration and harshness (NVH) from such internal combustion engines.

2. Description of the Prior Art

An internal combustion engine (ICE), also commonly known as a piston engine is a mechanical device in which the combustion of a fuel causes the expansion of gas under high temperature and high pressure in order to move piston and generate useful mechanical work. For almost 130 years, piston type ICE have found widespread use in almost every facet of life as a power source, especially for mobile applications, such as tractors, automobiles, boats and small aircrafts, or as household power tools of lawn mowers, trimmer, etc. There are generally two types, gasoline engine (Otto Cycle) and diesel engine (Diesel Cycle) based on fuel and cycle, or 4-stroke and 2-stroke based on strokes needed for one cycle, or reciprocating and rotary based on motion. ICEs are known for high exhaust noises they generate, ranging from 100-180 dB at cylinder discharge if not silenced, well beyond the Permissible Exposure Limit of 75 dB set by National Institute for Occupational Safety and Health (NIOSH) or the 90 dB of the Occupational Safety and Health Administration (OSHA). It is becoming more and more a nuisance to the surrounding environment with people living nearby or working in office.

A PD type ICE generally converts the energy of burned gases to shaft power through either linear or rotary positive displacement movement. As classified in FIG. 2a, piston motion can be either a 4-stroke or 2-stroke fueled by either gasoline or diesel, while rotary motion is exemplified by a Wankel engine. No matter what type of motion, shape, number of strokes or fuels (which in a broader sense includes other fuels such as kitchen grease), it undergoes the same thermodynamic Otto or Diesel cycle by trapping a fixed amount of fuel and gas into a cavity, burning that gas, expanding the gas to do mechanical work and discharging the consumed gas to outlet or atmosphere. Structurally, they all have in common an intake port, a fuel delivery device, a varying volume cavity, a discharge port and valves controlling the timing of the intake and discharge release of gas mixture. FIG. 3a shows the common phases and stroke function of a conventional 4-stroke piston engine: intake, compression, combustion, expansion and discharge. FIG. 3b shows the actual Otto cycle and its ideally simplified thermodynamic process as an isobaric inlet, isentropic compression, isochoric combustion, an isentropic expansion and an isochoric plus isobaric discharge. FIG. 3c shows a typical cycle coupled with an exhaust muffling operation and FIG. 3d the generic structure of a piston 25 inside a cylinder 20 forming a cavity 37 with a discharge port 38 connected to a catalytic converter 3 and an outlet muffler 5 in series.

In operation, the inlet stroke of the IC engine sucks in the vaporized fuel mixture (or just air in a diesel engine) into the cylinder as the piston moves to the maximum volume position BDC (bottom dead center) shown as 0→1 in FIG. 3a-b, and the inlet valve closes. In compression stroke, both valves are closed and the piston starts its movement to the minimum volume position known as TDC (top dead center) and compresses the fuel mixture. During this approximated isentropic process as shown by 1→2 in cycle diagram, the pressure, temperature and density of the fuel mixture all increase. It is immediately followed by an almost instantaneous combustion simplified as an isochoric process 2→3, as the fuel mixture burns. The increased high pressure exerts a greater amount of force on the piston and pushes it towards the BDC. Expansion of working fluid takes place isentropically from 3→4 and work is done by the system that is transmitted to the crank shaft. At the end of the power stroke the exhaust valve suddenly opens, releasing heat and some gas instantly as shown as a constant volume or isochoric process from 4→1. The exhaust stroke follows when piston starts its movement from BDC to TCD or 1→0, exhausting the rest of gas mixtures from the cylinder. At the end of this stroke, the exhaust valve closes, the inlet valve opens, and the sequence repeats in the next cycle.

4-stroke ICEs require two revolutions for a complete cycle while 2-stroke engines only need one revolution to complete the almost same process as described above. Many petrol and gas engines work on a cycle which is a slight modification of the Otto cycle such as Diesel cycle that uses a compression heating ignition rather than a separate ignition system. This variation allows diesel fuel be injected directly into the cylinder so that combustion occurs at constant pressure, instead of a constant volume as in Otto cycle. Another variation is called Atkinson and Miller cycle that has an asymmetrical compression and expansion strokes by using variable valve timing so that it operates more fuel efficiently.

In essence, all PD engines divide the continuous inlet gas stream mechanically into parcels of cavity size that is then disposed discretely to the exhaust after the work is done. This process inherently generates gas pulsations with a low frequency, often called cylinder firing rate, which is equal to discharge valve opening frequency or RPM/60 for a 2-stroke and RPM/120 for a 4-stroke ICE. On the other hand, the discharge pulsation is very significant if the cavity gas pressure is higher than the discharge exhaust pressure at the moment the discharge valve opens. It is this pressure difference at the discharge opening that is responsible for generating large amplitude pulsations which in turn excite noises and vibration of the entire engine system. The pulsations generated by the pressure difference at sudden discharge valve opening are periodical pressure spikes as high as 100-180 dB which could cause downstream mechanical damages and high noise if not properly controlled. Most often, pulsations are confined within the exhaust system and could result in fatigue failures of downstream components such as cylinder head, exhaust manifold, catalytic converter and exhaust muffler, or the turbocharger if equipped.

The muffler is now often required at the engine exhaust in order to control the exhaust pulsation and noises. The most common muffler type is reactive or sometimes absorptive or a combination of both is used too. This serially connected muffler or silencer is generally very effective in pulsation and noise control, reducing noise level (sound pressure level) by as much as 20-55 dB, but it suffers a fair amount of pressure losses at the same time. In principle for a serial muffler, more effective noise attenuation is always at the expense of higher pressure loss. Sometimes pressure loss can be as high as 2-4 psi under high load conditions. The loss of pressure or the increased exhaust back pressure reduces engine mechanical power output hence affecting its fuel efficiency. It is one of the contributing factors that results in low engine efficiency today, just 20-30%. An example for this trade-off is found on some performance vehicles such as race cars that used to replace a higher-attenuating-higher-loss reactive type muffler with a less-attenuating-less-loss absorptive type muffler. But the ever stringent regulations from the government and growing public awareness of the global warming and comfort level in residential and office areas have reversed that practice and given rise to an urgent need for both quieter and more efficient internal combustion engines as exemplified by new emission standards as CARB (California Air Resources Board).

The present invention tries to meet these environmental needs and tackle the problems at the source of loss and noise from a different perspective. The underlining theory is based on a postulation that large amplitude waves and instantaneous flows induced by pressure difference at the moment of exhaust valve opening are the primary cause of discharge pulsations and noises. This theory is analogous to a well studied physical phenomenon as occurs in a shock tube (invented in 1899) where a diaphragm separating a region of high-pressure gas from a region of low-pressure gas inside a closed tube suddenly burst open. As shown in FIGS. 1a-1b, when the diaphragm is suddenly broke open, a series of expansion waves is generated propagating from the low-pressure to the high-pressure region at the speed of sound, and simultaneously a series of pressure waves which can quickly coalesces into a shockwave is propagating from the high-pressure to the low-pressure region at a speed faster than the speed of sound, and inducing rapid fluid flow behind the wave front. An interface, also referred to as the contact surface that separates low and high pressure gases, follows at the same fluid velocity after the pressure waves or the shock wave.

To understand pulsation generation mechanism in light of the shock tube theory, let's review a cycle of a classical 4-stroke engine as illustrated in FIGS. 3a-3d by following one flow cavity from inlet to exhaust. First the vaporized fuel and air mixture enters into the cavity formed by a piston and a cylinder as inlet valve opens and closes. After the cavity is closed to both the inlet and outlet, the trapped gas is then being compressed, ignited and expanded, driving the piston doing mechanical work. When a desired expansion ratio is reached, the cavity is suddenly opened to the outlet and discharged. A serially connected discharge muffler is there to attenuate pulsation and noise generated at the exhaust opening.

In general, the cavity pressure of an ICE is higher than the outlet pressure as exhaust gas needs to get out of the cavity. This results in a forward flow rushing out of the cavity to equalize the outlet pressure as soon as the cavity is opened to the discharge according to the conventional theory. Since this happens almost instantaneously and there is almost no volume change for the cavity, the expansion is regarded as a constant volume process, or isochoric process as shown as 4→1 in FIGS. 3a-3b. However, according to the shock tube theory, the discharge valve opening at point 4 as shown in FIGS. 3a-3b, resembling the diaphragm bursting of a shock tube as shown in FIG. 1b, would generate a series of expansion waves into the cavity. The fan of expansion waves would sweep through the high pressure gas inside the cavity and expand it at the same time at the speed of sound. This results in an almost instantaneous adiabatic expansion because wave travels much faster than the fluid particle or piston. In this view, the wave induced expansion is the primary driver for pressure equalization process from 4→1 and this process is adiabatic in principle other than the conventionally assumed isochoric.

In view of the new theory to explain the pulsation generation mechanism, as the expansion waves travel to high pressure cavity as shown in FIG. 3d, simultaneously generated pressure waves or a shock wave front travel in the opposite direction causing rapid pressure increase and inducing forward flow down-stream. This shock wave travelling downstream at a speed faster than the speed of sound and inducing a fast flow behind is the dominant source of discharge pulsation and noise for a positive displacement internal combustion engine. Any effective pulsation and noise control should target this high velocity large amplitude mixture of waves and induced flow while minimizing the main flow losses at the same time.

Since the amplitude of gas pulsation in ICE is typically much higher than the upper limit of 140 dB set in the classical acoustics, the small disturbance assumption or the resulting linear wave equation is often inadequate to predict its behavior. Instead, the following rules can be used for large disturbances when the SPL is beyond 140 dB. These rules are based on the above discussed Shock Tube theory and can be used to judge the source of gas pulsation and quantitatively predict its amplitude and travel directions. In principle, these rules are applicable to different gases and for gas pulsations generated by any industrial PD type gas machinery or devices such as engines, expanders, or pressure compressors, vacuum pumps and valves.

1. Rule I: For two divided compartments (either moving or stationery) with different gas pressures $p_4$ and $p_1$ (FIG. 1a), there will be no or little gas pulsations generated if the two compartments stay divided;
2. Rule II: If the divider between the high pressure gas $p_4$ and the low pressure gas $p_1$ is suddenly removed (FIG. 1b), gas pulsations are generated at the location and moment of the opening as a composition of a fan of Pressure Waves (PW) or a quasi-shock wave, a fan of Expansion Waves (EW) and an Induced Fluid Flow (IFF) with magnitudes as follows:

$$PW = p_2 - p_1 \quad (1)$$

$$EW = p_3 - p_2 \quad (2)$$

$$\Delta U = (p_2 - p_1)/(p_1 \times W) \quad (3)$$

Where $\rho_1$ is the gas density at low pressure region, W the speed of the lead pressure wave, $\Delta U$ the velocity of Induced Fluid Flow (IFF);

3. Rule III: Pulsation PW is the action by the high pressure gas $p_3$ to the low pressure gas $p_1$ while pulsation EW is the reaction by the low pressure gas $p_1$ to the high pressure gas $p_3$ in the opposite direction, and their magnitudes are such that they equally divide the initial pressure ratio $p_3/p_1$ [equation (4): $p_2/p_1 = p_3/p_2 = (p_3/p_1)^{1/2}$]. At the same time, both PW and EW pulsations induce a unidirectional fluid flow pulsation IFF in the same direction as the PW.

Rule I implies that there would be no or little pulsations during compression (expansion) and combustion phases of a ICE cycle because of the absence of either a pressure difference or sudden opening. The focus instead should be placed upon the intake and exhaust phases, especially at the moment of the intake and discharge when it is suddenly opened and when there is a pressure difference at the opening.

Rule II indicates specifically the moment of pulsation generation as the instant the divider separating $p_3$ and $p_1$ opens and the location as the divider. Moreover, it defines two sufficient conditions for gas pulsation generation:

a) The existence of a pressure difference $\Delta p_{31}$;

b) The sudden opening of the divider separating that pressure difference.

Because all PD gas machinery converts energy between shaft and fluid by dividing incoming continuous fluid stream into parcels of cavity size and then discharging each cavity separately at the end of each cycle, there always exists a "sudden" opening at discharge phase to return the discrete parcels back to a continuous stream again. So both sufficient conditions are satisfied at the moment of discharge opening if there exists a pressure difference between the cavity and outlet it is opened to. For ICE, this pressure difference is always existing as $\Delta P_{41}$ as shown in P-V diagram of FIG. 3. In addition to the pressure difference induced pulsation, there co-exists a hardware (like a valve) induced flow pulsation too, but its magnitude is typically much smaller for most existing fluid machinery, and is roughly proportional to its equivalent velocity pressure. FIG. 2b shows graphically the relationship between the initial unbalanced pressures and the summation of resulting gas pulsations.

Rule II also reveals the composition and magnitudes of gas pulsations as a combination of large amplitude Pressure Waves (PW) or a quasi-shockwave, a fan of Expansion Waves (EW) and an Induced Fluid Flow ($\Delta U$). These waves are non-linear waves with changing wave form during propagation. This is in direct contrast to the acoustic waves that are linear and wave fronts stay the same and do not induce a mean through flow. It is interesting to note the wholeness of three different pulsations (PW, EW and IFF) that are generated simultaneously and one cannot be produced without the others. This makes gas pulsations very difficult to control because it's not one but all three effects have to be dealt with.

Rule III shows further the interactions between two gases of different pressures are mutual so that for every PW pulsation, there is always an equal but opposite EW pulsation in terms of pressure ratio ($p_2/p_1=P_3/p_2$). Together, they induce a unidirectional fluid flow pulsation (IFF) in the same direction as the pressure waves (PW).

It should also be emphasized the drastic difference on magnitude and behavior between acoustic waves and pulsations discussed above. First of all, the linear acoustics is limited to pressure fluctuation levels below 140 dB, equivalent to pressure below 0.002 Bar or 0.03 psi. For industrial type fluid machinery, the measured pressure fluctuation or pulsation is often in the range of 0.3-30 psi (or even higher), equivalent to 160-200 dB according to the SPL definition. So the pulsation pressures inside the industrial fluid machines are much higher and well beyond the pressure range intended in the Classical Acoustics. Physically, the acoustic waves are sound waves travelling at the speed of sound with no macro fluid movement with it while pulsations are a mixture of strong pressure and expansion waves that also induce an equally strong macro fluid flow travelling with speeds from a few centimeters per second up to 1.89 times of the speed of sound (Mach Number=1.89), for example. It is this large pressure forces and induced high velocity fluid flow that could directly damage a system and components on its travelling path, in addition to exciting vibrations and noises. With the above proposed Pulsation Rules, it is hoped that more realistic pulsation prediction is made possible so that the true nature of pulsations can be realized, hence controlled.

Accordingly, it is always desirable to provide a new design and construction of a PD type ICE that achieves high pulsation and NVH reduction at source, improves fuel efficiency and eliminates the discharge muffler at the same time.

SUMMARY OF THE INVENTION

Accordingly, it is an object of the present invention to provide a positive displacement internal combustion engine with a shunt pulsation trap in parallel with the cavity between piston and cylinder for trapping and attenuating pulsations at source.

It is a further object of the present invention to provide a positive displacement internal combustion engine with a shunt pulsation trap in parallel with the cavity between piston and cylinder that reduces exhaust back pressure and improves fuel efficiency.

It is a further object of the present invention to provide a positive displacement internal combustion engine with a shunt pulsation trap in parallel with the cavity between piston and cylinder that it is compact in size by eliminating a conventional discharge muffler or silencer.

It is a further object of the present invention to provide a positive displacement internal combustion engine with a shunt pulsation trap in parallel with the cavity between piston and cylinder that emits pulsation free gases into the exhaust system hence reduce fatigue failure for exhaust components.

It is a still further object of the present invention to provide a positive displacement internal combustion engine with a shunt pulsation trap in parallel with the cavity between piston and cylinder that is capable of achieving all the above objectives in a wide range of engine operating speeds and loads.

BRIEF DESCRIPTION OF THE DRAWINGS

Referring particularly to the drawings for the purpose of illustration only and not limited for its alternative uses, there is illustrated:

FIGS. 9a to 9d show a cross-sectional view of a rotary, a reed, a poppet or a sleeve valve in open and close positions respectively.

DETAILED DESCRIPTION OF THE PREFERRED EMBODIMENT(S)

Although specific embodiments of the present invention will now be described with reference to the drawings, it should be understood that such embodiments are examples only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

It should also be pointed out that though most drawing illustrations and description are devoted to a 4-stroke piston type internal combustion gasoline engine with generic valves undergoing an ideal Otto cycle in the present invention, the principle can be applied to rotary engines such as a Wankel, and to other fuel types such as diesel or gaseous gases, or to 2-stroke or 5 stroke or 6 stroke as well, and the corresponding cycles can be Diesel, Atkinson and Miller. In addition, positive displacement type expanders or pneumatic motors are the above variation too except the energy comes from compressed air other than fuel combustion.

Figure 1A:
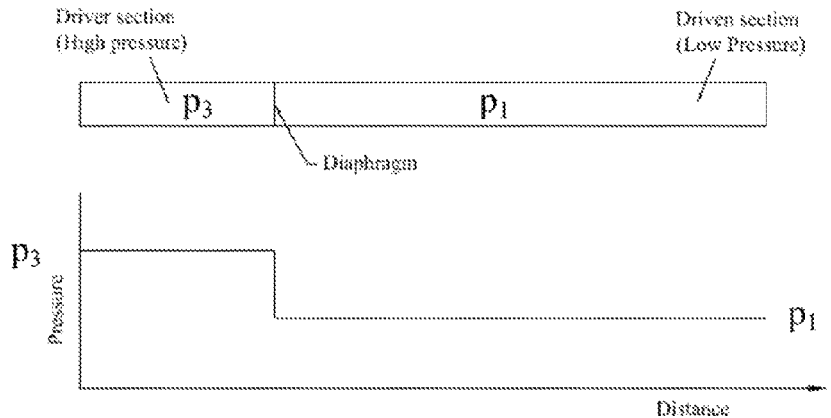
FIGS. 1a and 1b show the pressure and wave distribution of a shock tube device before and after the diaphragm is broke open.
Figure 1B:
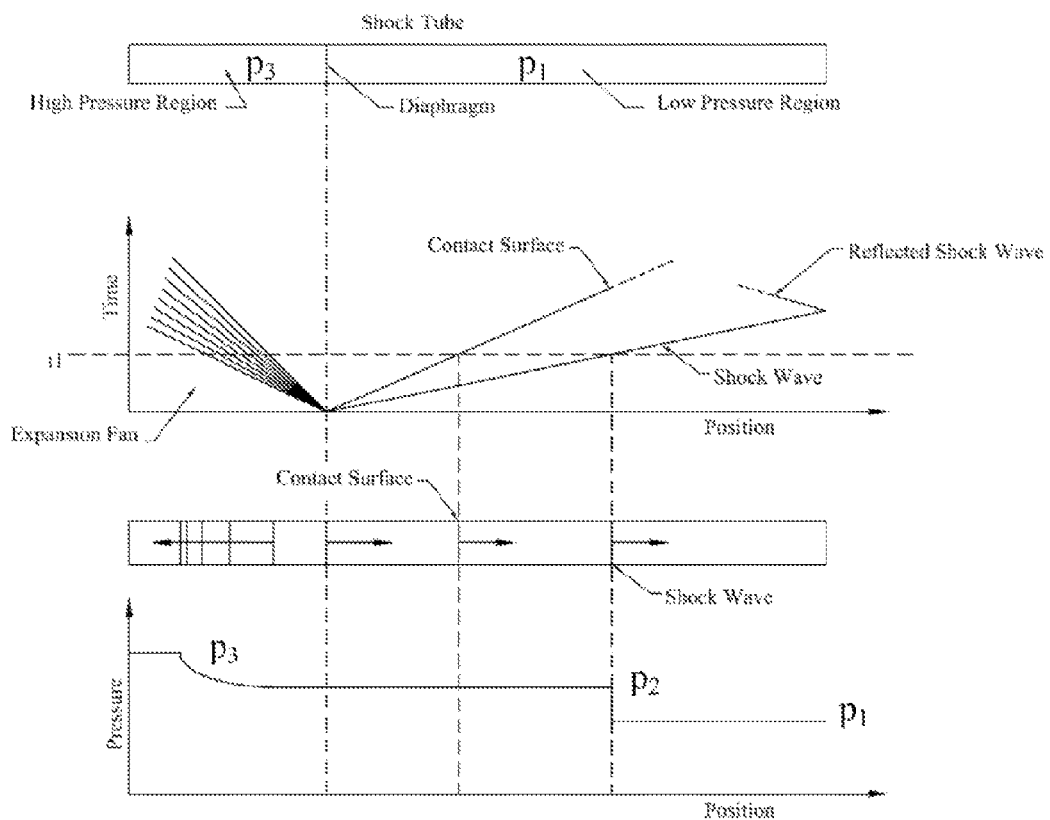
Figure 2A:
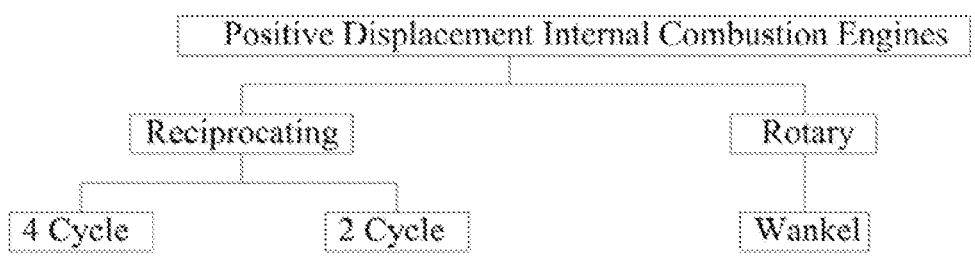
FIG. 2a shows a classification chart of different types of PD-ICEs covered under the present invention.
Figure 2B:
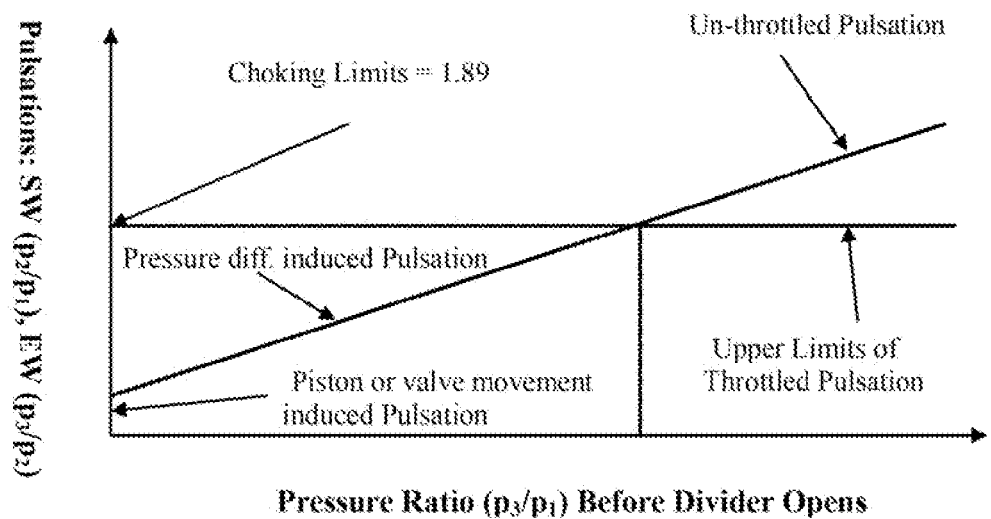
FIG. 2b shows the sources and amplitude of pulsation generation.
Figure 3A:
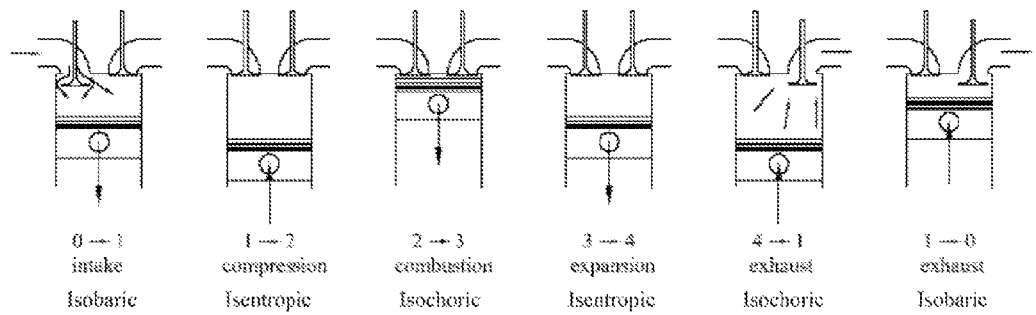
FIGS. 3a and 3b show the conventional power cycle of a classical 4-stroke piston engine.
Figure 3B:
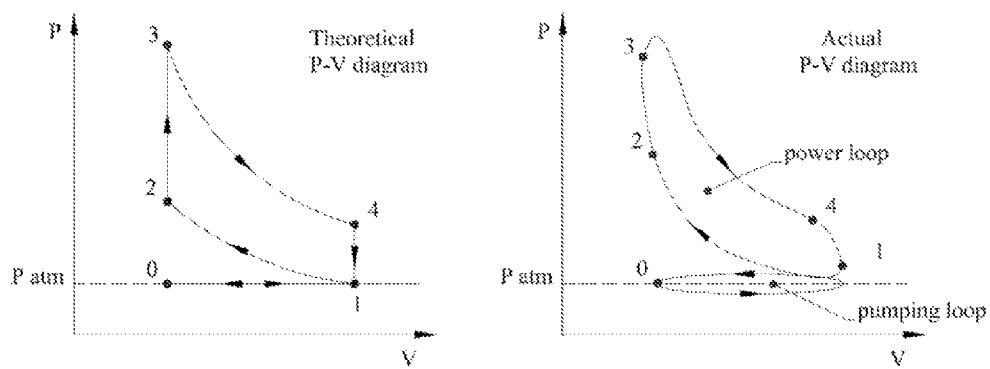
Figure 3C:
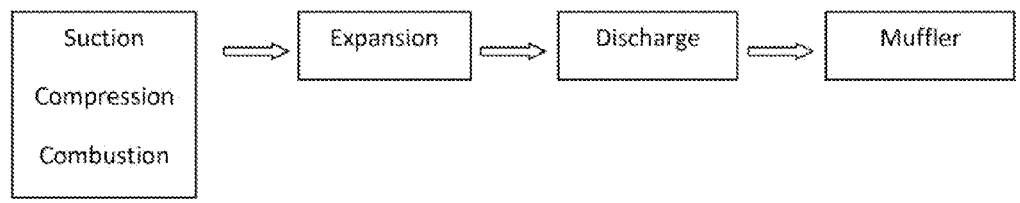
FIGS. 3c and 3d show the timing and wave mechanism of pulsation origination at engine exhaust when discharge valve is opened to a serial muffler.
Figure 3D:
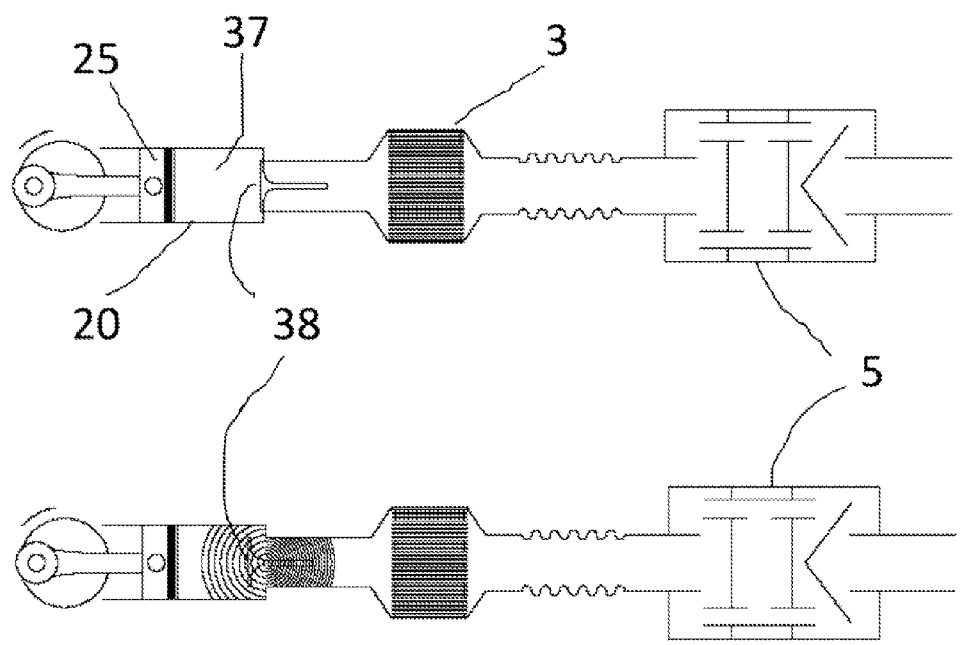
Figure 4A:
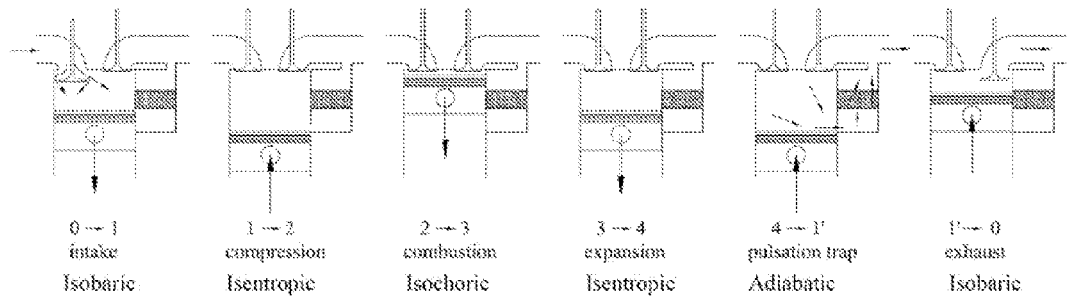
FIGS. 4a and 4b show the new power cycle of a 4-stroke piston engine with a shunt pulsation trap.
Figure 4B:
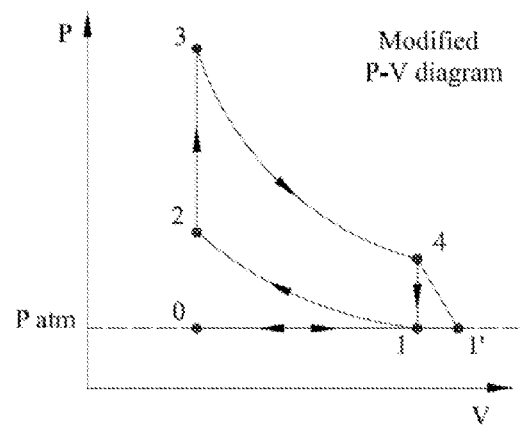

As a brief introduction to the principle of the present invention, FIGS. 4a to 4b show a modified Otto cycle of a 4-stroke IC piston engine with the addition of a shunt (parallel) pulsation trap phase, 4→1', of the present invention in such a way that expansion phase (piston doing work) is extended from 4 to 1'. In broad terms, pulsation traps are used to trap AND to attenuate exhaust pulsation before discharging to exhaust system or atmosphere. Discharge muffler is one type of pulsation trap (conventional type) which is connected in series with and after the ICE discharge port. The strategy is to separate and then to attenuate "bad" pulsations while let go with as little loss as possible "good" fluid flow. This is very difficult to achieve in reality simply because the unwanted "bad" pulsations are mixed together with "good" fluid flow and trying to control one will always result harming the other. The shunt pulsation trap is another type of pulsation trap which is connected in parallel with the ICE cavity and before the ICE discharge port. As illustrated in FIGS. 4a-4b, the phases of flow suction, compression, ignition and expansion are still the same as those shown in FIGS. 3a-3b of a conventional Otto cycle. But just at moment the expansion phase finishes (point 4 on FIG. 4b) and before discharge valve opens as in a conventional ICE, a new pressure equalizing phase, or Pulsation Trap phase, is added between the end of expansion and start of discharge stroke by subjecting the expanded cavity to a pre-opening port, called pulsation trap inlet, located before the ICE discharge port as shown in FIGS. 4a and 4d. The trap inlet is branched off from ICE cavity into a chamber, called pulsation trap volume, which is also communicating with ICE exhaust through a feedback region called trap outlet located opposite to trap inlet, as shown in FIG. 4d. Between the trap inlet and outlet, and within the trap volume, there exists one or more pulsation dampening devices, to control (reduce and/or contain) pulsation energy before it travels to ICE exhaust system. The strategy is to induce out hence separate the "bad" pulsations from the "good" fluid flow before it is exhausted. After being separated, the "bad" pulsations are trapped inside the trap chamber and being attenuated while the "good" fluid flow will stay inside the ICE cavity and waited to be discharged. As shown in top illustration of FIG. 4d at the moment when ICE cavity is just opened to the trap inlet while still closed to the ICE discharge, a combination of waves and flow are generated at trap inlet due to a pressure difference between the pulsation trap (relates to ICE exhaust pressure) and ICE cavity. For the case of a higher cavity pressure, pressure waves or shockwave and an induced forward flow are generated into the low pressure pulsation trap and are being attenuated there, while on the other side, simultaneously generated expansion waves travel into the high pressure cavity reducing pressure inside. Because waves travel at a local sound speed about 10-20 times faster than the piston speed, the pressure equalization inside the cavity or pulsation attenuation inside the trap volume are almost instantaneous, and finishes before the phase of discharge stroke starts. Therefore, as shown in bottom illustration of FIG. 4d at the moment when the ICE cavity is opened to the ICE exhaust, the pressure inside the cavity is already equal to the exhaust back pressure, hence discharging a pressure-difference-free, or a pressure-pulsation-free gas flow. On the other hand, by controlling the timing at the end of pulsation trap phase and start of exhaust valve discharging phase in such a way that the conventional expansion phase can be extended from point 4 to point 1' as shown in FIG. 4b. This extra area, 41'14 on FIG. 4b (P-V diagram), is the additional adiabatic work by the piston, contributing to the overall engine fuel efficiency. Moreover, a reduced exhaust back pressure by eliminating conventional serial muffler at exhaust would further increase the fuel efficiency.

The principal difference with conventional PD-ICE is in discharge and dampening phase: instead of waiting and delaying dampening action after the discharge valve opens through a serially-connected muffler, the present invention shunt pulsation trap method would start dampening before the discharge valve opens by inducing pulsations into a pre-opened paralleled trap. It then dampens the pulsations within the trap simultaneously as the ICE piston goes through that extra adiabatic expansion. In this process, most of gas mixture remains inside ICE cavity while the fraction containing pulsations is separated out into the parallel trap so that attenuating pulsation will not affect the main body of fluid inside the cavity.

There are several advantages associated with the parallel pulsation trap compared with the conventional serially connected muffler or resonator. First of all, pulsations are separated out from the main cavity flow so that an effective attenuation on pulsations (say a higher dampening coefficient material or design) will not affect the losses of the cavity flow, resulting in both higher flow efficiency and better pulsation attenuation effectiveness. This in turn eliminates the serial muffler and the associated loss, hence improves engine fuel efficiency. In a conventional serially connected muffler, both pulsations and cavity flow travel mixed together through the dampening elements where a better attenuation on pulsations always comes at a cost of higher pressure losses. So a compromise is often made in order to reduce losses by sacrificing the degree of pulsation dampening and noise reduction as in case of switching from a reactive to an absorptive type for a drag race car. With a parallel pulsation trap, pulsation attenuation and fuel efficiency are achieved at the same time, contrary to a serial muffler.

Secondly, a parallel pulsation trap attenuates pulsation before the discharge valve, much closer to the pulsation source than a serial one that is often the last component in a whole exhaust system. This eliminates the exposure of exhaust components to the highly damaging pulsations in a conventional exhaust system, hence improves their mechanical reliability. It can be built as an integral part as close as possible to ICE cavity so that overall size and footprint of the ICE exhaust system is much smaller. By replacing the conventional serially connected muffler with a more compact parallel pulsation trap, the noise radiation and vibrating surfaces are much reduced too. Moreover, the pulsation trap casings can be made of a metal casting that will be more wave or noise absorptive, thicker and more rigid than a conventional sheet-metal muffler casing, thus further reduce noise and vibration.

Figure 4C:
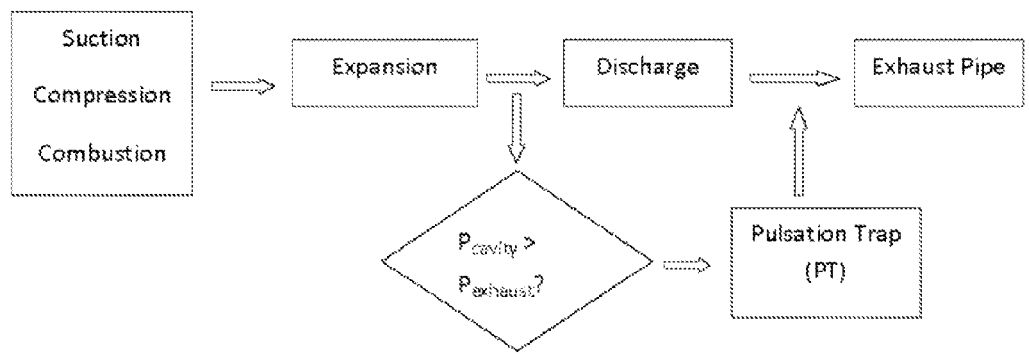
FIGS. 4c and 4d show the new timing and wave mechanism of pulsation origination at pulsation trap when the trap inlet is opened first and discharge valve after.
Figure 4D:
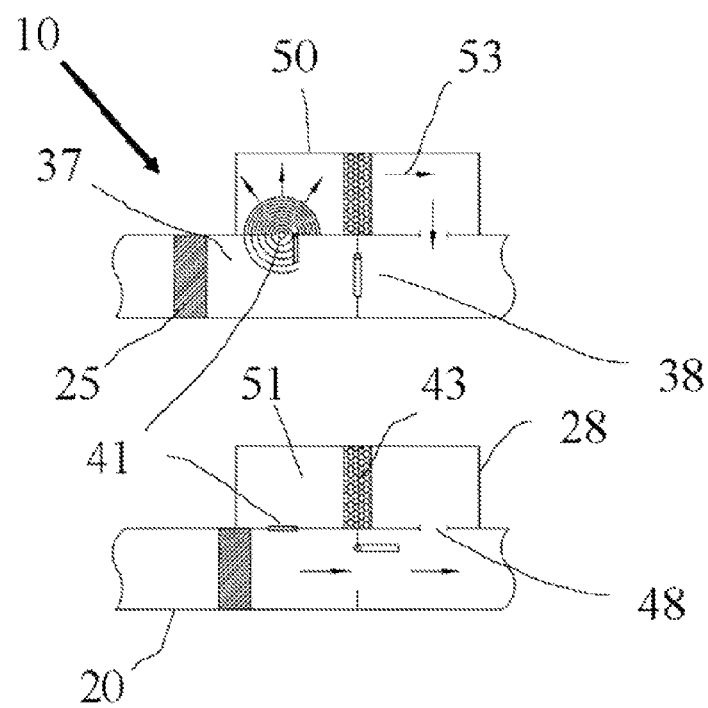

Referring to FIG. 4c-4d, there is shown a typical arrangement of a preferred embodiment of a PD-ICE 10 with a shunt pulsation trap apparatus 50. Typically, a PD-ICE 10 has a suction port (not shown) and a gas trapping cavity 37 that is expanded and drives a piston 25 doing work before being discharged to ICE outlet 38 of the ICE 10. The PD-ICE 10 also has a casing 20 that houses the ICE cavity 37 and the drive piston 25, another casing 28 nearby or integral with casing 20, forming a pulsation trap chamber 51 inside.

As an important novel and unique feature of the present invention, the shunt pulsation trap apparatus 50 is positioned in parallel with the ICE cavity 37 of the PD-ICE 10 of the present invention, and its generic cross-section is illustrated in FIG. 4d. In the embodiment illustrated, the shunt pulsation trap apparatus 50 is further comprised of a relief port (trap inlet) 41 branching off from the ICE cavity 37 into the pulsation trap chamber 51 and a feedback region (trap outlet) 48 communicating with the ICE outlet 38, therein housed pulsation dampening device. As the trap inlet 41 is suddenly opened as shown in the top illustration in FIG. 4d, a series of expansion waves are generated at trap inlet 41 going into the ICE cavity 37. Simultaneously a series of pressure waves and an induced forward flow 53 are generated at trap inlet 41 travelling into the trap volume 51, going through dampener 43 before reaching trap outlet 48 and ICE outlet 38. The forward flow 53 as indicated by arrows goes from the trap inlet 41 into the pulsation trap chamber 51 through the dampener 43 then to the trap outlet 41, merging with the ICE outlet 38. To improve the flow efficiency of the induced flow 53 at the trap inlet 41, a converging cross-sectional shape 63 or a converging-diverging cross-sectional (De Laval nozzle) shape 65 as shown in FIG. 6c can be used in flow direction 53, replacing an inefficient orifice shape 61. In the bottom illustration of FIG. 4d, arrows show the direction of the flow inside cavity 37 when being discharged to the ICE outlet 38.

When a PD-ICE 10 is equipped with the shunt pulsation trap apparatus 50 of the present invention, there exist both a reduction in the pulsation emitted from PD-ICE to ICE exhaust system and an improvement in fuel efficiency.

The theory of operation underlying the shunt pulsation trap apparatus 50 of the present invention is as follows. As illustrated in FIG. 4a to 4d and also refer to FIG. 5, phases of flow suction, compression, ignition and expansion are still the same as those shown in FIGS. 3a-3b of a conventional PD-ICE. But just at the moment the expansion phase finishes, instead of being opened to ICE outlet 38 as a conventional PD-ICE does, the expanded cavity 37 is pre-opened to trap inlet 41 while discharge port 38 is still closed. As shown in FIG. 4d, if there is no pressure difference between the pulsation trap chamber 51 (close to pressure at outlet 38) and ICE cavity 37, then nothing happens even as two are connected. But if a pressure difference exists, normally cavity pressure is higher than exhaust back pressure for an ICE, a series of pressure waves or shock wave are generated at trap inlet 41 traveling into the trap volume 51 while at the same time a series of expansion waves are generated into the cavity. The expansion waves traveling into the cavity 37 reduce the cavity pressure and doing an extra work while at the same time, the pressure waves or a shock wave enter the pulsation trap chamber 51, and therein are being attenuated by dampening device 43. Because waves travel at a speed about 10-20 times faster than the driving piston or lobe speed, the expansion and attenuation are almost instantaneous, equalizing the pressure difference, hence discharging a pressure-pulsation-free gas media to outlet 38. Therefore, a conventional serially connected outlet muffler is not needed anymore thus saving space and weight.

Figures 5A, 5B:
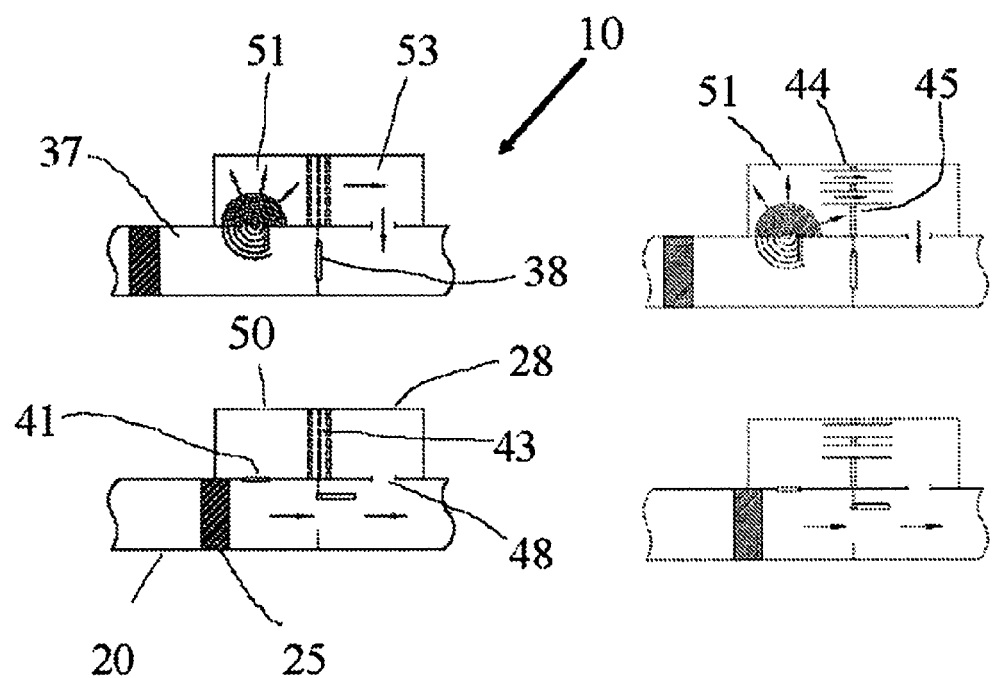
FIGS. 5a and 5b show a cross-sectional side view of a preferred embodiment of the shunt pulsation trap with some typical absorptive dampening elements and with some typical reactive dampening elements.

While FIG. 5a shows a shunt pulsation trap 50 with some typical absorptive elements such as at least one perforated plate 43 included as the dampening device, FIG. 5b demonstrates another shunt pulsation trap with some typical reactive elements consisting of a combination of chokes 44 on a divider 45 inside the trap volume 51 provided as the dampening device. In theory, either one or more such dividers can be used as a multistage dampening device.

Figure 6A:
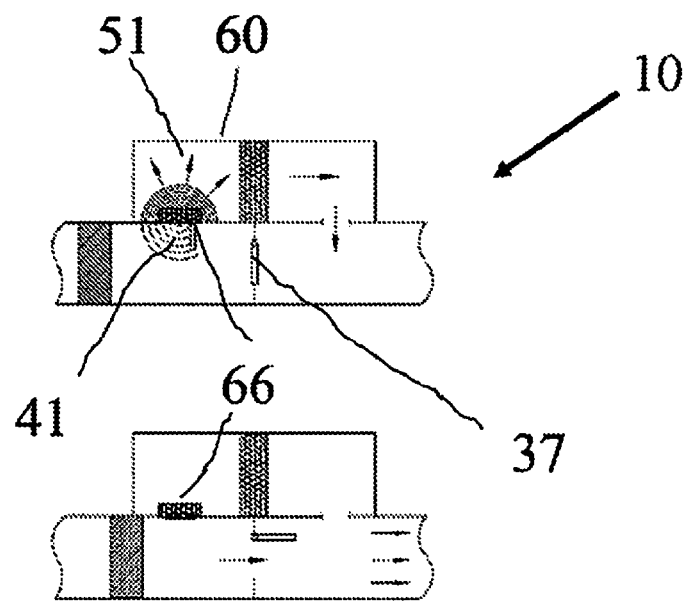
FIGS. 6a and 6b show cross-sectional side views of an alternative embodiment of the shunt pulsation trap with a porous plug at the trap inlet and different styled porous plugs.
Figure 6B:
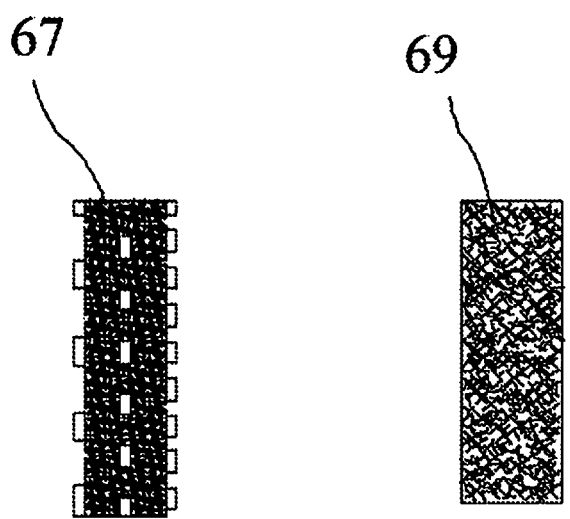
Figure 6C:
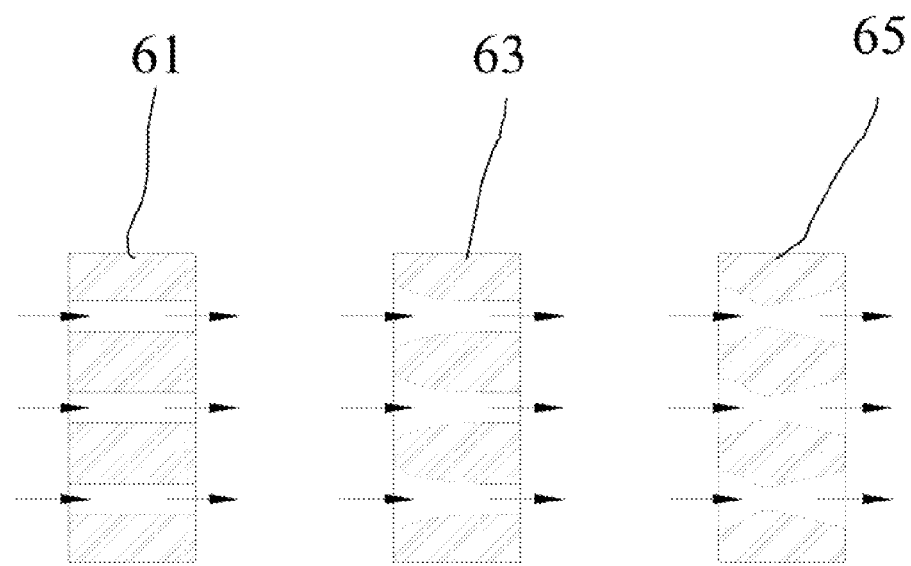
FIG. 6c shows different hole shapes of the trap inlet or perforated damper plate.

FIG. 6a shows a typical arrangement of an alternative embodiment of the positive displacement device 10 with a shunt pulsation trap apparatus 60. In this embodiment, a porous plug 66 is used at the trap inlet acting as an additional dampener to the preferred embodiment of the pulsation trap 60. The porous plug 66 can be made of either perforated layers 67 or porous material 69, as shown in FIG. 6b, that can cause additional pressure drop and turn it into heat at the source of pulsation 41 (throat) in order to reduce the magnitude of the generated pulsations either into the cavity 37 or into the trap 51.

Figure 7:
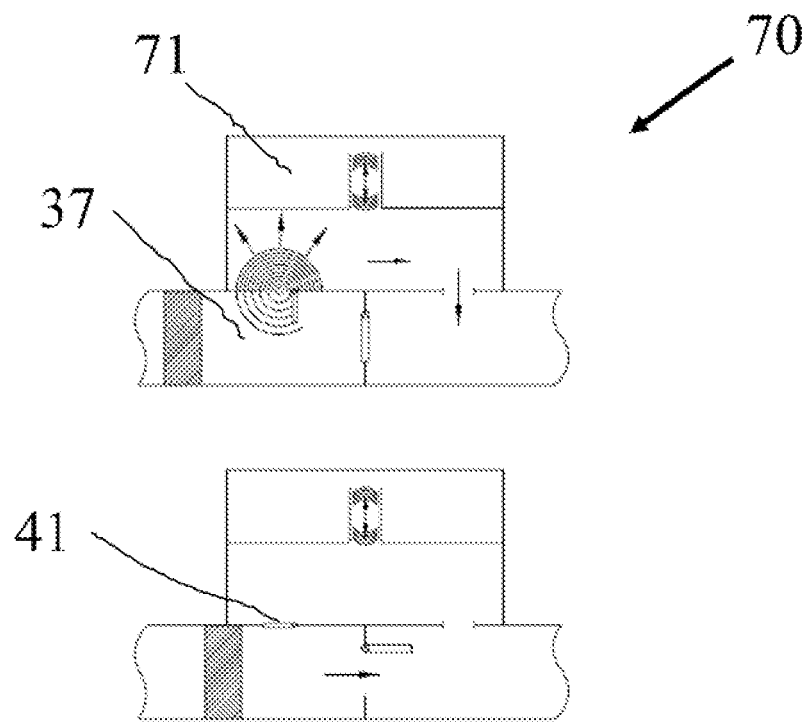
FIG. 7 shows a cross-sectional side view of an alternative preferred embodiment of the shunt pulsation trap with a resonator.

FIG. 7 shows a typical arrangement of yet another alternative embodiment of the PD-ICE 10 with a shunt pulsation trap apparatus 70. In this embodiment, Helmholtz resonator 71 is used as an alternative pulsation eliminating device supplementing the pulsation trap 70. In theory, Helmholtz resonator could reduce specific undesirable frequency pulsations by tuning to that frequency thereby eliminating it. Since the PD-ICE generates a specific pocket passing frequency when sometimes running at fixed speed and a Helmholtz resonator could be tuned to that specific frequency for elimination. In this embodiment, the pulsations generated at trap inlet 41 would be treated by Helmholtz resonator 71 located close to trap inlet 41. It can be used alone or in multiple numbers or different sizes.

Figure 8:
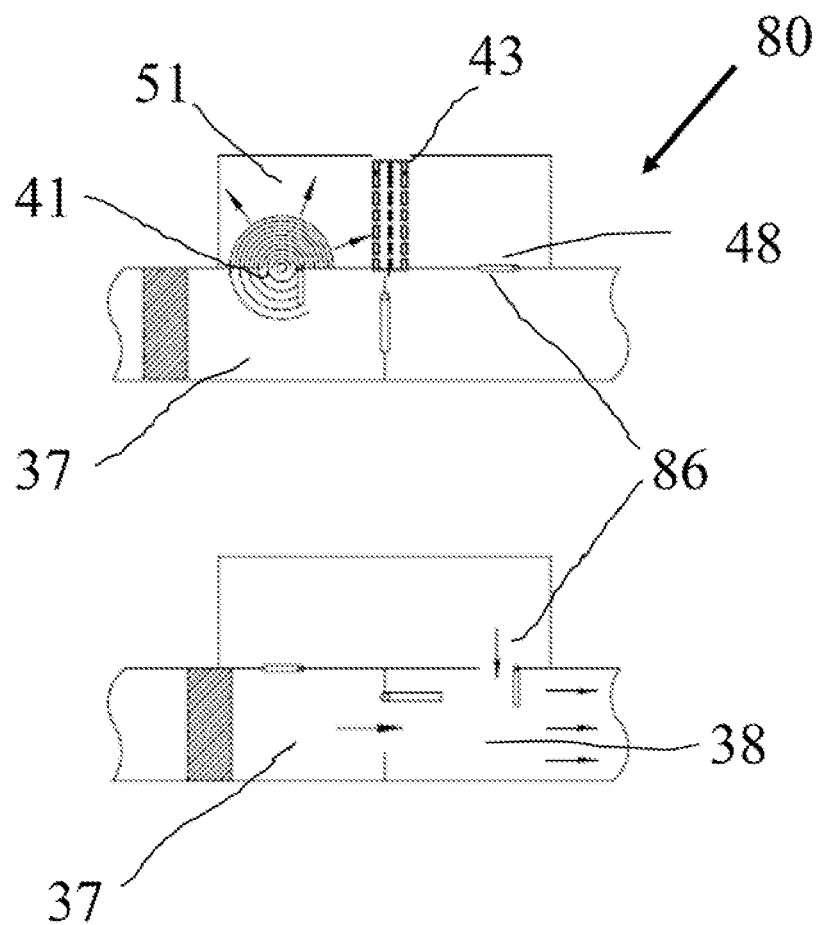
FIG. 8 shows cross-sectional side views of yet another alternative embodiment of the shunt pulsation trap with a valve at trap outlet.

FIG. 8 shows a typical arrangement of yet another alternative embodiment of the PD-ICE 10 with a shunt pulsation trap apparatus 80. In this embodiment, a control valve 86 is used as pulsation containment device for pulsation containment by the pulsation trap 80 at the trap outlet 48. In addition, FIG. 8 shows a configuration with an optional perforated-plate dampener 43 between trap inlet 41 and control valve 86. The principle of the operation is taking advantages of the opposite travelling direction of wave and flow inside the pulsation trap 80. By using a directional controlled valve 86, it would only allow pulsation flow out while keeping the waves from going out of the trap in a timed fashion. The top view of FIG. 8 shows the wave containment phase with the trap inlet 41 open to the expansion cavity 37 while the trap outlet 48 is closed by the valve 86. In the same way, the bottom view of FIG. 8 shows the discharge or exhaust phase when the expansion and wave attenuation are finished and the trap outlet 48 is opened through the valve 86. The valve 86 used could be any types that are capable of being flow controlled like a reed valve or timed with trap inlet opening in a fashion as described above, and one example is given in FIG. 9a for a rotary valve. In operation, as an example shown in FIG. 8 again, a series of waves are generated as soon as the pulsation trap inlet 41 is opened during the containment phase. The expansion waves would travel into the cavity 37 allowing piston doing extra work while the accompanying pressure waves and induced flow enter the pulsation trap chamber 51 in opposite direction. At this time, the valve 86 located at the trap outlet 48 is closed, effectively sealing the pulsations within the pulsation trap chamber 51 where it is being dampened by an optional dampener 43 inside. After the pressure difference is diminishing and cavity 37 is opened to outlet 38 as shown in the bottom view of FIG. 8, the valve 86 at trap outlet 48 is opened allowing gas out of the trap. Since the volume of the pulsation trap chamber 51 is sized larger than the cavity 37, the pressure inside the pulsation trap 51 before valve 86 opens is typically very close to exhaust pressure. By alternatively open and close valve 86 in a synchronized way timed with the trap inlet opening, the waves and pulsation energy could be effectively contained within the trap, resulting in a pulse-free gas flow to the outlet.

It is apparent that there has been provided in accordance with the present invention a PD-ICE with a shunt pulsation trap for effectively reducing high exhaust pulsations without increasing overall size of the internal combustion engine while eliminating conventional discharge muffler and improving fuel efficiency. While the present invention has been described in context of the specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A PD-ICE, comprising:
   a. a housing structure having a flow suction port, a flow discharge port, and a cavity;
   b. a positive displacement driving piston reciprocally mounted inside said housing cavity and driven through a reciprocating motion within said housing cavity by combustion of fuel; and
   c. a shunt pulsation trap apparatus comprising a trap chamber positioned adjacent to said housing cavity, at least one pulsation dampening device positioned within said trap chamber, at least one trap inlet branching off from said cavity before said discharge port and into said pulsation trap chamber upstream of the pulsation dampening device, and at least one trap outlet downstream of the pulsation dampening device and communicating said pulsation trap chamber with said discharge port; and
   d. wherein in operation said PD-ICE achieves reduced pulsation and NVH, reduced exhaust size and weight, and improved fuel efficiency.

2. The PD-ICE as claimed in claim 1, wherein said combustion includes an expansion phase and an exhaust phase, and wherein said trap inlet has at least one synchronized valve that is timed to open after said expansion phase finishes and to close just before said discharge port is opened at the start of the exhaust phase.

3. The PD-ICE as claimed in claim 1, wherein said trap inlet has a converging cross-sectional shape or a converging-diverging cross-sectional shape.

4. The PD-ICE as claimed in claim 1, wherein said pulsation dampening device comprises at least one layer of perforated plate, at least one acoustical absorption material for turning pulsation into heat.

5. The PD-ICE as claimed in claim 1, wherein said pulsation dampening device comprises at least one divider plate with chokes inside said trap chamber.

6. The PD-ICE as claimed in claim 1, wherein said pulsation dampening device comprises at least one layer of perforated plate on which there is at least one synchronized valve that is timed to close or open as said trap inlet is opened or closed.

7. The PD-ICE as claimed in claim 1, wherein said pulsation dampening device comprises at least one Helmholtz resonator.

8. The PD-ICE as claimed in claim 1, wherein said pulsation dampening device comprises at least one Helmholtz resonator in parallel with at least one layer of perforated plate or at least one acoustical absorption material for turning pulsation into heat.

9. The PD-ICE as claimed in claim 1, wherein said pulsation dampening device comprises at least one Helmholtz resonator in parallel with at least one synchronized valve that is timed to close or open as said trap inlet is opened or closed.

10. The PD-ICE as claimed in claim 1, wherein said pulsation device comprises at least one control valve located at said trap outlet, for pulsation containment.

11. The PD-ICE as claimed in claim 1, wherein said pulsation device comprises at least one layer of perforated plate or at least one acoustical absorption material for turning pulsation into heat, in series with at least one control valve located at said trap outlet, for pulsation containment.

12. The PD-ICE as claimed in claim 10, wherein said control valve is a one way valve.

13. The PD-ICE as claimed in claim 10, wherein said control valve is a rotary valve, a sleeve valve, or a poppet valve that is synchronized to close or open as said trap inlet is opened or closed.

14. The PD-ICE as claimed in claim 2, wherein said valve is a rotary valve, a poppet valve, or a sleeve valve.

15. The PD-ICE as claimed in claim 6, wherein said valve is a rotary valve, a poppet valve, or a sleeve valve.

16. The PD-ICE as claimed in claim 9, wherein said valve is a rotary valve, a poppet valve, or a sleeve valve.

17. The PD-ICE as claimed in claim 1, wherein said pulsation dampening device comprises, at said trap inlet, at least one porous plug for turning pulsation into heat.

18. The PD-ICE as claimed in claim 1, wherein said combustion is a cycle that includes an expansion phase, and wherein said trap inlet branches off from said cavity between said discharge port of said pulsation trap chamber and said piston at an end position of an expansion phase.

19. The PD-ICE as claimed in claim 1, wherein said trap outlet communicates with said discharge port past the combustion cavity in an exhaust flow direction.

* * * * *